UNITED STATES PATENT OFFICE.

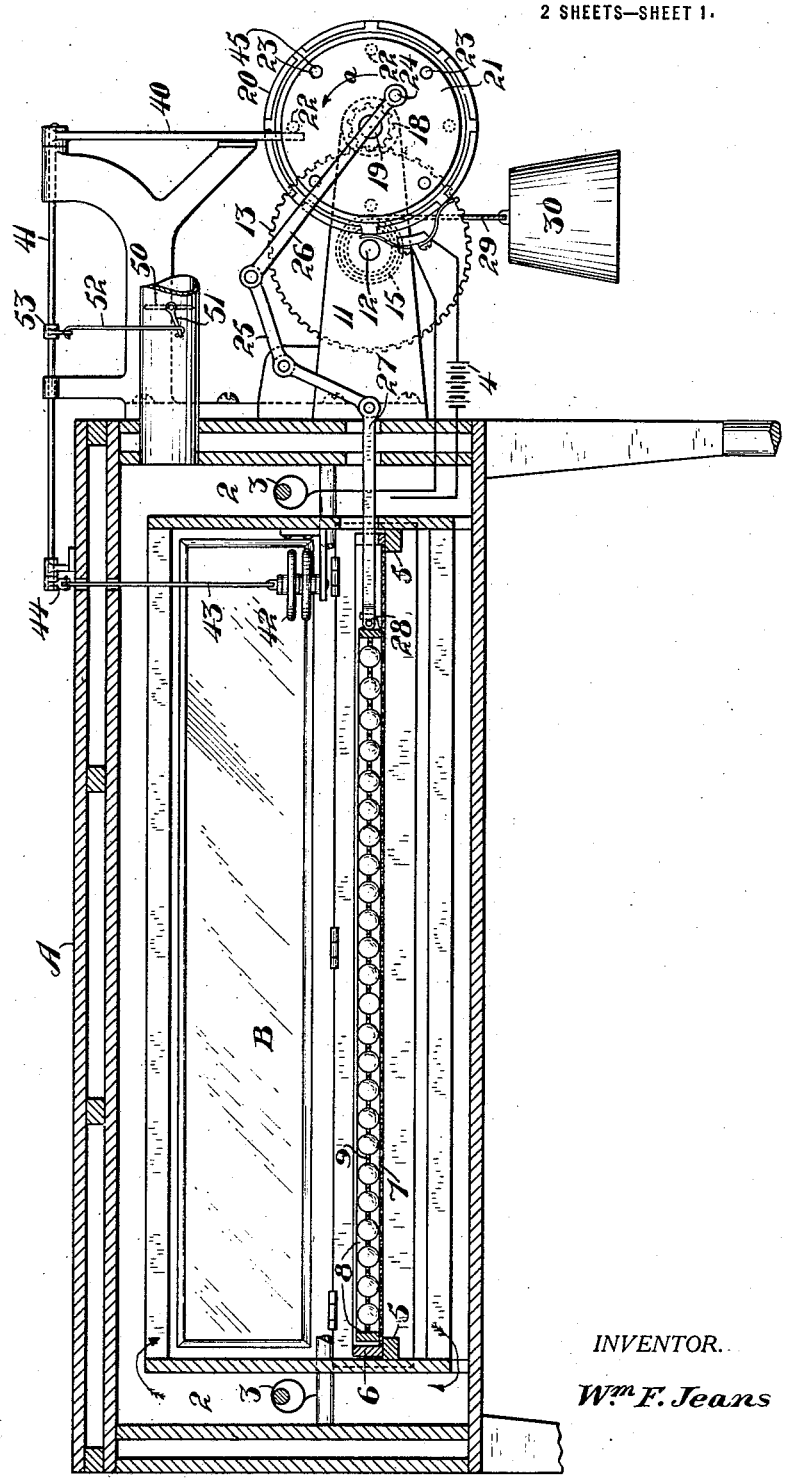

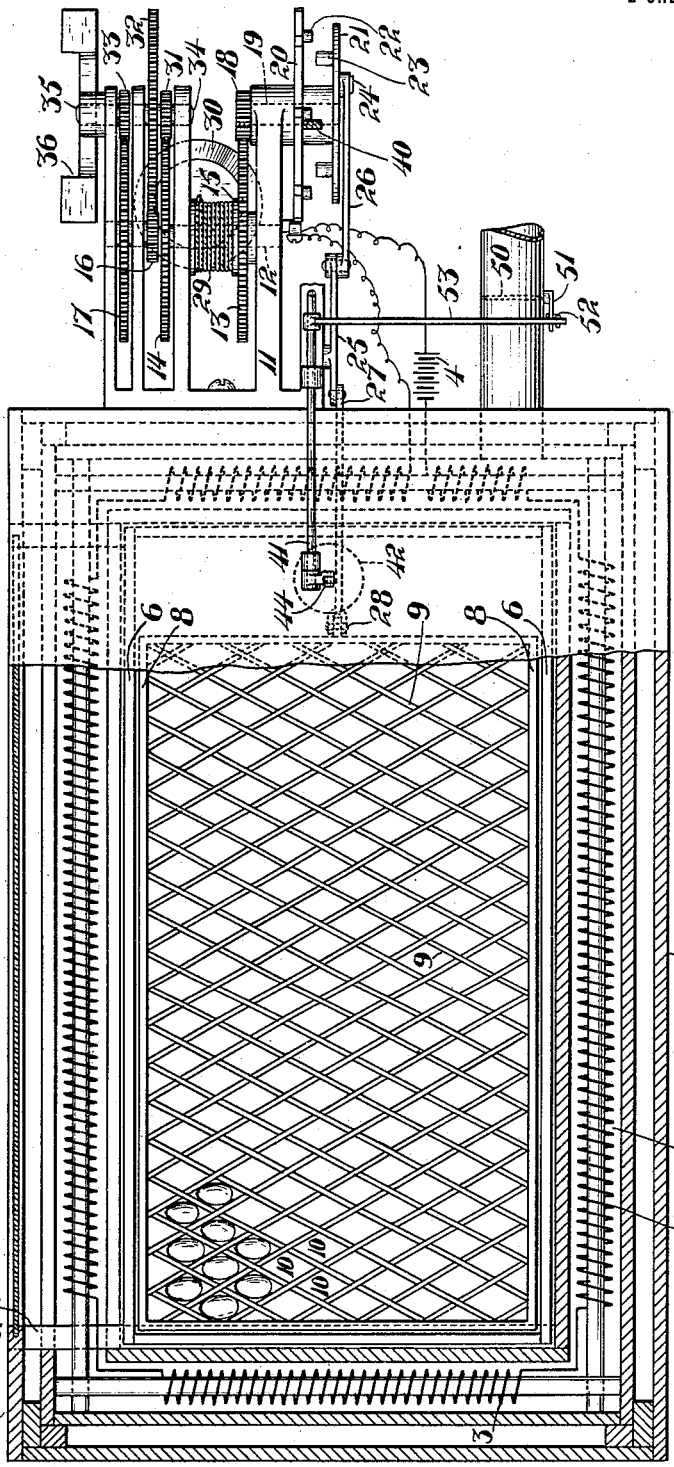

WILLIAM F. JEANS, OF SANTA ROSA, CALIFORNIA.

EGG-TURNER.

1,297,175.  Specification of Letters Patent.  Patented Mar. 11, 1919.

Application filed December 18, 1917. Serial No. 207,652.

*To all whom it may concern:*

Be it known that I, WILLIAM F. JEANS, a citizen of the United States, residing at Santa Rosa, in the county of Sonoma and State of California, have invented new and useful Improvements in Egg-Turners, of which the following is a specification.

This invention relates to an egg turner which, while it may be applied and used in connection with practically any standard form of incubator, is in the present instance shown as applied to an incubator forming the subject-matter of a copending application entitled "Incubator," filed December 18th, 1917, Serial Number 207,653.

One of the objects of the present invention is to provide means automatically actuated by the temperature within the incubator for operating the egg turner. Another object of the invention is to provide means for transmitting a step by step intermittent movement to the egg turner first in one direction and then in the other to gradually turn the eggs, and also to provide an egg turner constructed as will hereinafter be described which will prevent the eggs from moving out of alinement with relation to each other while they are being turned. Another object of the invention is to provide a weight actuated motor from which power is transmitted to operate the egg turner, and in conjunction therewith to provide means actuated by the temperature within the incubator for regulating the movement of the weight motor. Further objects will hereinafter appear.

The invention consists of the parts and the construction and combination of parts as hereinafter more fully described and claimed, having reference to the accompanying drawings, in which—

Figure 1 is a central, vertical, longitudinal section through an incubator, showing the application of the invention.

Fig. 2 is a plan view partly in section.

Referring to the drawings in detail, A indicates a box-like, exterior housing, interiorly of which is formed an egg chamber B. The egg chamber is, in the present instance, surrounded by an annular heating chamber 2 in which is positioned a plurality of heating elements 3 which are connected with a source of current supply, as the battery 4.

Formed within the egg chamber is a supporting shelf 5, and adapted to be received by said shelf is an egg tray 6 which is provided with a screen bottom 7. Slidably mounted within the tray 6 is an egg turning frame 8 and carried by said frame is a wire mesh structure 9 which forms a plurality of cells 10 adapted to surround or partly inclose each egg supported within the tray 6.

One of the features of the present invention is the provision of means for imparting a step by step intermittent movement to the sliding frame 8 first in one direction and then in the other to gradually turn the eggs. This is accomplished in the following manner: Secured at one end of the main housing is a bearing bracket 11 and journaled in said bracket is a shaft 12, on which is secured a pair of gears, such as shown at 13 and 14. Also secured upon the shaft is a drum 15 and turnably mounted on the shaft is a pair of gears 16 and 17. Intermeshing with the gear 13 is a pinion 18 which is secured upon a shaft 19 and also secured upon the shaft 19 is a pair of interspaced disks 20 and 21. Secured on the inner face of disk 20 are four short pins 22 and secured on the inner face of the disk 21 are four long pins 23. Secured to the outer face of the disk 21 is a crank pin 24 and connecting said crank pin with a lever 25 pivotally secured in the bracket 11 is a connecting link 26; the opposite end of the lever 25 being in turn connected through a link 27 with a hook 28 or other suitable connection formed on the end of the sliding tray.

Adapted to be wound about the drum 15 is a cable 29 and secured on the end of said cable is a weight 30. Intermeshing with the gears 14, 16 and 17 are gears 31, 32 and 33. The gears 31 and 32 are secured on a driving shaft 34 journaled in the bracket 11 while the gear 33 is secured on a second shaft 35 also journaled in the bracket in approximate alinement with the shaft 34, and secured on the said shaft 35 is a governor fan 36 of the usual construction. The gears 13 and 18 are provided for transmitting rotary movement to the shaft 19 and the disks 20 and 21 carried thereby, while the gear train mounted on the opposite side of the drum 15 is merely provided for the purpose of operating the governor 36, said governor serving as a means for regulating the revolving speed of shaft 19.

While a specific form of gear drive is here shown for the purpose of operating the governor 36 and while a specific form of governor is shown, I wish it understood that any suitable form of governing mechanism may be provided. The shaft 19 is only intermittently rotated, i. e., the pins 22 and 23 provided form stops and as eight pins are provided it can readily be seen that the rotation of the shaft 19 is stopped eight times before a complete revolution of the same takes place. The rotation of the disks is transmitted through the link 26, rocker arm 25 and the link 27 to move the sliding frame 8, and as eight stops are made, it is obvious that reciprocal movement is transmitted to the frame and four interruptions are made whether it is traveling in one direction or the other. The rotation of the disks is indicated by arrow $a$ and the stopping of same occurs when one of the pins engages a detent 40 which is secured upon a shaft 41. The lower end of the detent 40 extends down between the disks and means have been provided for transmitting an oscillating movement to the detent so that it may move out of engagement with one set of pins and into the path of travel of the opposite set of pins. This is accomplished by mounting a thermostat 42 within the egg chamber. This thermostat is connected by a rod or link 43 with a short crank arm 44 secured on the shaft 41. In other words, expansion of the thermostat, due to excess heat within the egg chamber, is transmitted to rock the shaft 41 in one direction and contraction of the thermostat, due to the lowering of the temperature, pulls the link 43 and thereby rocks the shaft in the opposite direction.

Referring to Fig. 1, it can be seen that one of the pins is in engagement with the detent 40. The arm will remain in engagement with this pin until the temperature within the egg chamber rises to a predetermined point. This rise, of course, causes an expansion of the thermostat which is transmitted through the link 43 to rock the shaft 41, thus moving the detent 40 out of engagement with the pin shown into the path of travel of a second pin 45 which is secured to the opposite disk. Disengagement of the detent 40 from the pin shown leaves the disks free to revolve in the direction shown until the second pin engages the detent, the power to rotate the disks being, of course, transmitted from the weight 30 and the gear shown.

The detent 40 is moved out of engagement with the pin shown, due to a rise in temperature, and disengagement permits rotation of the disks until a second pin engages the detent. This pin remains in engagement until the temperature decreases to such a degree that the thermostat will contract a sufficient distance to move the detent out of engagement with the second pin, thus again permitting the disks to revolve until a third pin engages. The intermittent rotation of the disks transmitted through the crank pin link 26, rocker arm 25 and the link 27 moves the frame only a slight distance, four movements being transmitted while the frame slides in one direction and four movements being transmitted when the frame slides in the opposite direction. The eggs are in this manner gradually turned and they are not at any time suddenly turned as the governing mechanism driven by the gear train previously described only permits the disks to rotate comparatively slowly.

The intermittent rotation of the disks is also used to make and break a circuit through the heating coils 3, that is, a pair of brushes are mounted adjacent to one of the disks and contacts are formed along the periphery of one or both of the disks which permit the making or breaking of a circuit through the heating coils and the battery 4. This arrangement is quite important as it permits a comparatively quick making and breaking of the circuit, thus prevents arcing or burning of the contacts as usually happens where thermostatic controls are employed.

The rocking of the shaft 21 in the present instance is also utilized to open and close a ventilator shown at 50. This ventilator is provided with a crank arm 51 and a link 52 which is connected with a crank arm 53 secured on the shaft. The mechanism provided, therefore, not only serves the function of making and breaking a circuit through the heating coils and shifting the egg frame, but it also serves as a means for automatically ventilating the incubator when required.

The weight motor provides the actual power required for the purpose of shifting the egg frame, while the thermostat regulated by the temperature within the incubator serves as a means for interrupting the movement of the weight motor. It may, therefore, be broadly stated that means have been provided for turning the eggs, said means being actuated by temperature variations within the egg chamber.

While the ventilator is here shown as operated in conjunction with the thermostat 42, I wish it understood that a separate thermostat may be provided for this purpose, if desired, for instance as shown in my co-pending application previously referred to, and while a specific form of weight motor and circuit making and breaking mechanism is here shown, any other suitable power may be employed for this purpose. Also the materials and finish of the several parts employed may be such as the experience and judgment of the manufacturer may dictate.

Heretofore it has been common practice, particularly when turning eggs by hand, to let the eggs remain on one side for a given period of time and then to completely turn them so that the other side will be exposed; in other words, two sides only of the eggs are exposed to the highest temperature. This feature has been entirely overcome in the present instance as the means provided for gradually turning the eggs insures an even exposure of the entire surface of the eggs, something that has not been accomplished heretofore and which is of material importance in the successful hatching of the eggs.

Having thus described my invention, what I claim and desire to secure by Letters Patent is—

1. The combination with the egg supporting tray in an incubator, of a frame slidably mounted thereon, means on said frame adapted to engage the eggs to turn same when the frame is moved, and means actuated by temperature variations within the incubator for intermittently advaning the frame a plurality of times first in one direction and then in the other.

2. The combination with the egg supporting tray in an incubator, of a frame slidably mounted thereon, means on said frame for turning the eggs, a driving member, means connected with the driving member for transmitting a reciprocal movement to the sliding frame, and means actuated by temperature variations within the incubator for interrupting the movement of the driving member.

3. The combination with the egg supporting tray in an incubator, of a frame slidably mounted thereon, means on said frame for turning the eggs, a driving member, a pair of interspaced disks adapted to be rotated by the driving member, stop members on each disk, a member movable between the stop members to interrupt the rotary movement of the disks, means actuated by temperature variations within the incubator for operating the movable member, and means connected with the disks for transmitting a reciprocal movement to the egg turning frame.

4. The combination with the egg supporting tray in an incubator, of a frame slidably mounted thereon, means on said frame for turning the eggs, a driving member, a pair of interspaced disks adapted to be rotated by the driving member, stop members on each disk, a member movable between the stop members to interrupt the rotary movement of the disks, means actuated by temperature variations within the incubator for operating the movable member, and means mounted on the disks for intermittently advancing the frame a plurality of times first in one direction and then in the other direction.

5. The combination with the egg supporting tray in an incubator, of a frame slidably mounted thereon, means on said frame for turning the eggs, a driving member, a pair of interspaced disks adapted to be rotated by the driving member, stop members on each disk, a member movable between the stop members to interrupt the rotary movement of the disks, means actuated by temperature variations within the incubator for operating the movable member, a ventilator on the incubator, and means for opening and closing said ventilator in conjunction with the operation of the movable member.

6. The combination with the egg tray in an incubator and the egg chamber in which it is mounted, of a plurality of heating coils adapted to heat the egg chamber, a frame slidably mounted on the egg tray, means on said frame for turning the eggs, a driving member, a pair of interspaced disks adapted to be rotated by the driving member, stop members on each disk, an arm movable between the stop members to interrupt the rotary movement of the disks, means actuated by temperature variations within the incubator for operating the movable arm, means connected with the disks for transmitting a reciprocal movement to the egg turning frame, and means actuated by the disks for making and breaking a circuit through the heating coils.

In testimony whereof I have hereunto set my hand in the presence of two subscribing witnesses.

WILLIAM F. JEANS.

Witnesses:
 JOHN H. HERRING,
 W. W. HEALEY.